United States Patent [19]

Lawson

[11] 4,259,945

[45] Apr. 7, 1981

[54] EXHAUST SYSTEM WASHING APPARATUS

[76] Inventor: Richard L. Lawson, 3272 N. Greenwood Ave., Sanger, Calif. 93657

[21] Appl. No.: 83,689

[22] Filed: Oct. 11, 1979

[51] Int. Cl.³ .............................................. F24C 15/20
[52] U.S. Cl. .............................. 126/299 E; 134/115 R; 134/167 R
[58] Field of Search ........... 126/299 D, 299 E, 299 R, 126/299 F; 98/115 R; 134/167 C, 167 R, 179, 166 R, 166 C, 115 R; 239/239, 240

[56] References Cited

U.S. PATENT DOCUMENTS

| 2,954,038 | 9/1960 | Girard | 134/167 R |
|---|---|---|---|
| 3,236,249 | 2/1966 | Everroad | 134/167 R |
| 3,795,181 | 3/1974 | Lawson | 126/299 E |
| 4,031,910 | 6/1977 | Lawson | 134/167 C |
| 4,085,735 | 4/1978 | Kaufman | 126/299 E |

Primary Examiner—James C. Yeung
Attorney, Agent, or Firm—Huebner & Worrel

[57] ABSTRACT

An exhaust system washing apparatus for use in an exhaust system having a flue and a suction fan to draw air through the flue in which a fluid conducting swivel joint is mounted at each end of the flue and together define an axis of rotation disposed centrally of the flue, a pair of substantially parallel conduits extended longitudinally of the flue and mounted on the swivel joints for revolution about the axis, and provided with orifices disposed toward the interior of the flue, one swivel joint being connected to a source of washing fluid under pressure and the opposite joint being adapted to receive a portion of the fluid from the conduits for delivery to a nozzle which emits such portion onto the blades of the fan.

2 Claims, 3 Drawing Figures

EXHAUST SYSTEM WASHING APPARATUS

BACKGROUND OF THE INVENTION

1. Field of the Invention

The present invention relates to an exhaust system washing apparatus and more particularly to such an apparatus which is permanently mounted and washes grease and similar matter from fans and from the interior of flues used to exhaust air from the vicinity of ranges and the like employed in restaurants and other facilities where cooking is extensively performed.

2. Description of the Prior Art:

The prior art contains a variety of apparatus utilizing sprays to clean grease and similar matter from ductwork through which air containing grease and related matter is exhausted from hoods above cooking equipment. Typical prior art apparatus for this purpose is described in the patents cited in the "Prior Art Statement" below. These patents describe the difficulties and dangers arising from accumulation of such matter which blocks ductwork, is unsanitary, and constitutes a serious fire hazard. The apparatus disclosed in these patents includes various permanently mounted rotating spray devices extending centrally of a flue which conveys air containing such matter. These devices perform quite satisfactorily when utilized within flues which are of relatively small cross section, especially if the cross section is circular. However, when utilized within rectangular flues and circular flues of large diameter, a centrally originating fluid spray does not uniformly nor adequately reach all portions of the interior of the flue.

Exhaust systems for the above-described purpose typically utilize ductwork leading from the area where cooking is performed to a relatively remote suction fan which draws air from the area through the ductwork. Although grease and the like collects on the blades of such a fan with the attendant difficulties and dangers mentioned above, prior art exhaust system washing apparatus does not, to the applicant's knowledge, include integrally designed elements for washing such matter from the fan blades. Since the exhaust system is frequently designed and installed as an entity, it is desirable for a washing apparatus therefor also to be designed and constructed as an entity for economical installation and for convenience and effectiveness in use. In particular, it is highly desirable that all elements of such an exhaust system be controlled simultaneously to ensure that all portions thereof are cleaned in one operation.

PRIOR ART STATEMENT

Characterizing the closest prior art of which the applicant is aware and in compliance with 37 C.F.R. 1.97 and 1.98, attention is invited to the following patents issued to the applicant, copies of which are attached:

| Patent No. | Date |
| --- | --- |
| 3,795,181 | March 5, 1974 |
| 4,031,910 | June 28, 1977 |

U.S. Pat. No. 3,795,181 is believed relevant in its disclosure of a rotationally mounted, elongated discharge conduit extended within an exhaust flue and provided with a plurality of spaced orifices for spraying washing fluid onto the interior of the flue. U.S. Pat. No. 4,031,910 is believed relevant in its disclosure of such a conduit which is rotationally driven by the reaction to fluid discharged through the orifices.

SUMMARY OF THE INVENTION

Accordingly, it is an object of the present invention to provide an improved exhaust system washing apparatus.

Another object is to provide such apparatus which effectively and uniformly washes all portions of the interior of a flue utilized in a system for exhausting air laden with grease and similar matter from the vicinity of cooking apparatus, although the flue is of relatively large size and/or of rectangular cross section.

Another object is to provide such apparatus which washes grease and the like from fan blades utilized in such a system while simultaneously washing ductwork employed therein.

Another object is to provide such apparatus in which a conduit having spray orifices within a flue of such a system is utilized to carry fluid from one end of the flue for washing a fan at the opposite end thereof.

Another object is to provide such a system which is easily mounted in an existing flue or fitted to new construction and which is conveniently adaptable to flues of any reasonable length.

These and other objects and advantages are achieved by providing an exhaust system washing apparatus which is economical and fully effective in accomplishing its intended purposes and has a plurality of conduits extended within a flue for orbiting about an axis centrally of the flue, the conduits being eccentrically related to this axis and having orifices for emitting a portion of a quantity of washing fluid which enters one end of the conduits through a swivel joint, the conduits converging the balance of the fluid to a swivel joint at the opposite end of the conduits for emission adjacent thereto from a fixed nozzle.

DESCRIPTION OF THE PREFERRED EMBODIMENT

Figure 1:
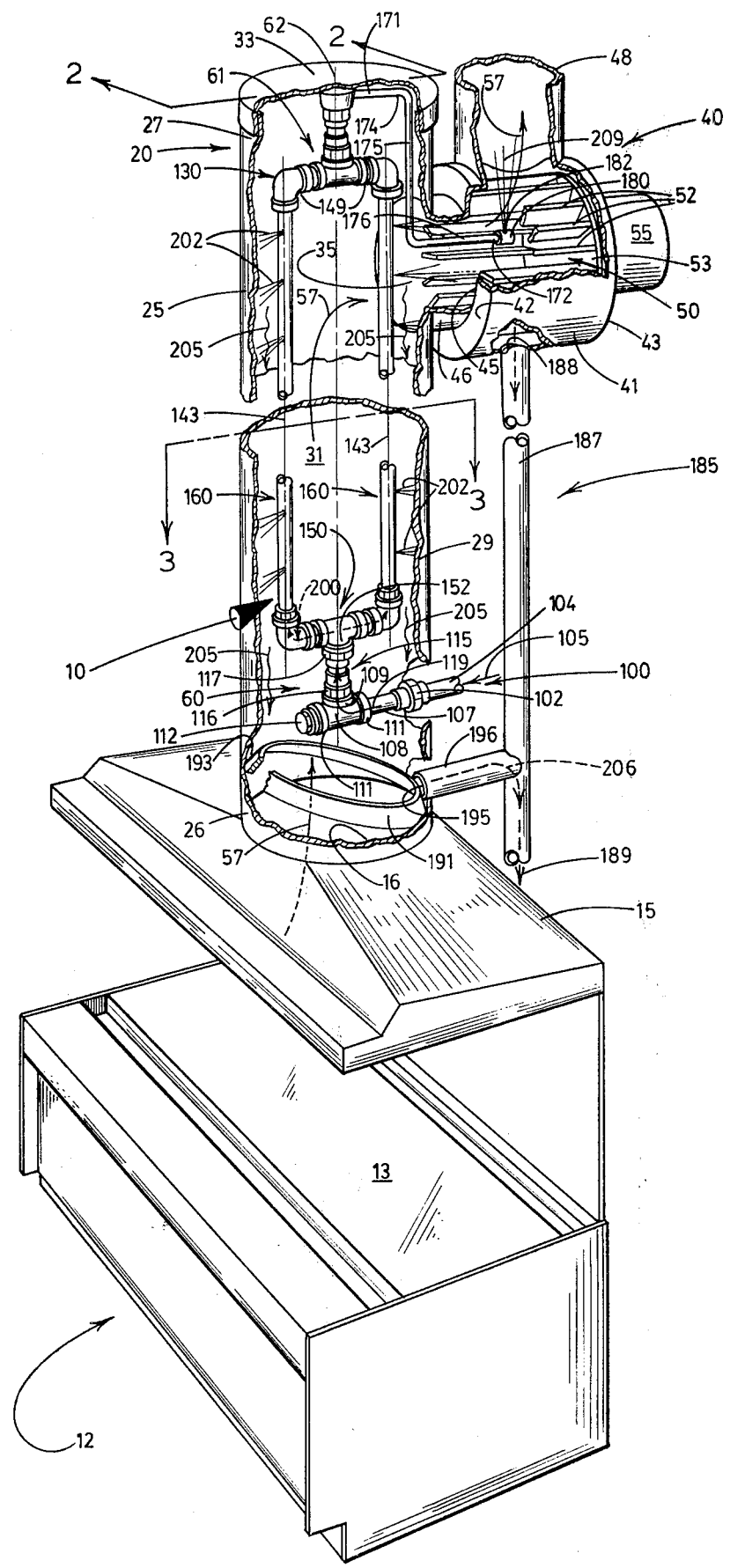
FIG. 1 is a perspective view of an exhaust system washing apparatus embodying the principles of the present invention in an illustrative operating environment with portions broken away to show the interior.

Referring more particularly to the drawings, in FIG. 1 is shown an exhaust system washing apparatus 10 embodying the principles of the present invention in a representative operating environment.

The environment includes a range 12 having a cooking surface 13 whereon cooking, which releases volatilized grease and similar matter, is performed. The range is provided with a hood 15 of any suitable form which converges upwardly to a generally circular opening 16.

The range 12 and hood 15 are provided with an exhaust system 20 of conventional construction which has a substantially vertical cylindrical flue 25 having a lower end 26 and an opposite upper end 27. The flue has a side wall 29 which provides an interior surface 31. The lower end is open and is peripherally joined to the opening 16 while the upper end is closed by a discoidal cap 33. The flue has a generally circular outlet opening 35 whose diameter is nearly that of the flue. The opening is disposed in the side wall in downwardly spaced adjacent relation to the cap and has a substantially horizontal axis.

The exhaust system 20 has an exhaust fan 40 of well-known squirrel-cage type or any other suitable form. The fan has a cylindrical housing 41 coaxially related to the outlet opening 35. This housing has a planar discoidal inlet end 42 facing the opening and an opposite discoidal mounting end 43. The inlet end 42 has an opening 45 aligned with the outlet opening and of substantially equal diameter. These openings are interconnected by a short cylindrical duct 46. The fan has a fragmentarily represented discharge duct 48 extending upwardly from the housing.

The fan 40 has a cylindrical rotor 50 having a plurality of circumferentially spaced blades 52. The blades extend axially along the periphery of the rotor from a disc 53, which is rotationally mounted on the mounting end 43 of the housing, and is rotationally driven by a motor 55 mounted on this end oppositely of the disc.

The hood 15, flue 25, and fan 40 are supported in any suitable manner on a structure which houses the range 12. When the exhaust system 20 is in use, the motor is energized and rotates the rotor 50 so as to draw air from the cooking surface into the hood, through the flue, and into the fan, as indicated by the arrows 57. As this air passes over the cooking surface, grease and other volatile matter is carried with the air and, to a considerable extent, exhausted through the discharge duct. However, substantial quantities of this matter collect on the interior surface 31 of the flue and on the blades 52 as the air passes over these elements.

The washing apparatus 10 has a first or inlet swivel joint 60 mounted on the flue 25. This joint is disposed interiorly of the flue in upwardly adjacent relation to its lower end 26. The apparatus has a second or outlet swivel joint 61 mounted interiorly of the flue on the cap 33 and, therefore, adjacent to the fan 40. These joints define a rotational axis 62 substantially aligned with the central axis of the flue.

Figure 2:
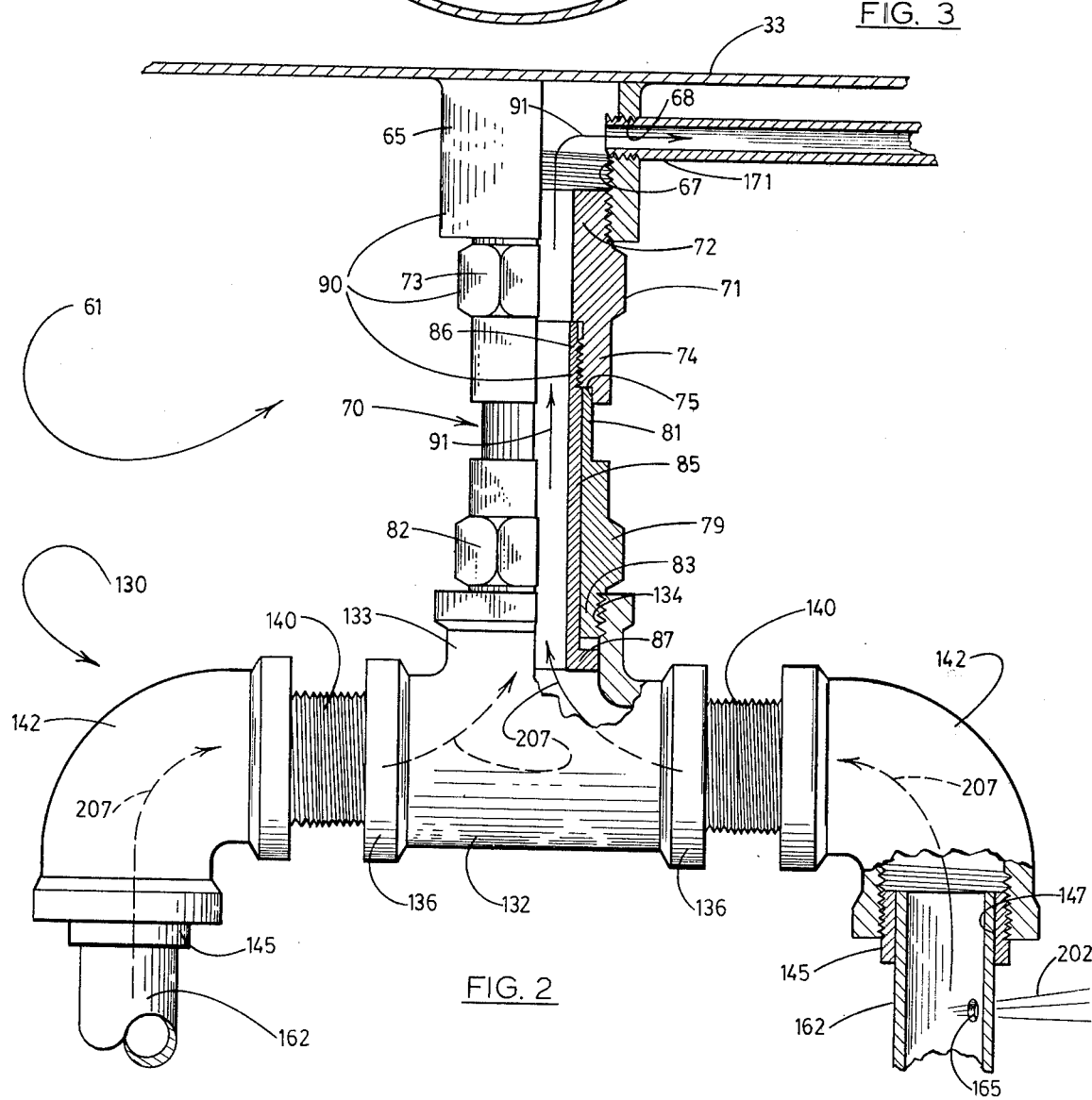
FIG. 2 is a fragmentary view of a swivel joint and related elements taken from the position of line 2—2 of FIG. 2 at an enlarged scale with portions broken away to show the interior.

As shown in FIG. 2, the outlet swivel joint 61 has a hollow drum 65 whose axis is coincident with the axis 62. The upper end is fixedly connected in fluid-tight relation, as by welding, to the lower side of the cap 33. The lower end of the drum is open and provided with coaxial internal screw threads. The drum is provided with a screw threaded bore 68 extending through its side parallel to the axis of the outlet opening 35. This bore faces the fan 40 above the outlet opening and is substantially smaller in diameter than the screw threads.

The outlet joint 61 has a rotary fluid connection 70 of a well-known type aligned with the axis 62. This connection has a first nut 71 having an externally screw threaded upper portion 72 which mates with the screw threads 67 of the drum 65, a central portion 73 of externally hexagonal shape, and an internally screw threaded lower portion 74. This nut has a counter bore 75 in its lower portion downwardly of the internal screw threads therein. The rotary connection has a second nut 79 which has a cylindrically tubular upper portion 81 rotationally received in the counter bore, an externally hexagonal central portion 82, and an externally screw threaded lower portion 83. The rotary joint has a tubular sleeve 85 rotationally fitted within the second nut and extended oppositely therefrom. The sleeve has an externally screw threaded upper end 86 which is tightly screw threadably engaged within the lower portion of the first nut. The opposite, lower end of the sleeve has an annular flange 87 disposed outwardly and somewhat downwardly of the lower portion of the second nut. The exterior diameter of the flange is slightly less than that of this portion so that the sleeve retains the second nut to the first nut.

The upper swivel joint 61 thus has a stationary portion 90 mounted on the cap 33 and formed by the drum 65, the nut 71, and the sleeve 85. This joint is adapted for passage of fluid therethrough, as indicated by the arrows 91, from the end of the sleeve provided with the flange 87 to the bore 68.

The lower swivel joint 60, as shown in FIG. 1, includes a pipe 100 extending radially through the side wall 29 of the flue 25 somewhat above its lower end 26. The pipe has a central union 102. One portion of the union is fixedly secured to the wall in any suitable manner so as to support the pipe on the flue. The pipe has an outer length 104 extended outwardly from the flue for connection to a well-known source, not shown, of washing fluid of any suitable type under pressure which enters the pipe as indicated by the arrow 105. The pipe has an inner length 107 which extends from the union within the flue to a tee 108. The tee has a central arm 109 and a pair of arms 111 oppositely extended therefrom. All of these arms are provided with internal screw threads, not shown. One of the oppositely extended arms is screw threadably engaged with the inner length of pipe and the other of these arms is closed by a plug 112. The central arm opens upwardly in substantial alignment with the axis 62.

The inlet swivel joint 60 has a rotary connection 115 which is substantially identical to the connection 70 but is disposed in inverted relation thereto. The connection of the inlet joint has a downwardly disposed first nut 116 which is tightly screw threadably engaged within the central arm 109 and has an upwardly disposed second nut 117 which is rotationally mounted on the first nut and has upwardly extended screw threads, not shown, corresponding to those of the lower portion 83 of the second nut 79.

The pipe 100, the tee 108, and the nut 116 thus form a stationary portion of the inlet swivel joint 60. This portion is fixedly mounted on the flue. The swivel joint is thereby adapted for passage of washing fluid through it, as indicated by the arrows 119, from the source thereof through the second nut 117 which forms a rotating portion of this joint.

The apparatus 10 has, as shown in FIGS. 1 and 2, a bifurcated or first or outlet bracket 130. This bracket has a central tee 132 having an upwardly extended central arm 133 provided with internal screw threads 134 and a pair of horizontal, internally screw threaded arms 136 extended oppositely therefrom. This central arm is disposed downwardly of the swivel joint 61 in coaxial relation to it. The screw threads of the central arm are tightly screw threadably engaged with the lower portion 83 of the second nut 79 and thereby fixedly connect the bracket to the nut for rotation therewith about the axis 62.

Each horizontal arm 136 has a pipe nipple 140 screw threadably engaged therein, and each nipple has one arm of a 90° pipe elbow 142 screw threadably engaged thereon. The opposite arm of each elbow is directed downwardly in alignment with an offset axis 143 parallel to the central axis 62 and spaced therefrom approximately one-half of the radius of the flue 25. The offset axes are thus disposed eccentrically within the flue in diammetrically spaced relation to the central axis. Each elbow has a bushing 145 screw threadably received within its downwardly directed arm. The bushings have individual central cylindrical bores 147 aligned with the corresponding offset axis 143. The nipples and elbows form a pair of opposite arms 149 of the bracket 130 through which fluid can flow from the bushings through the central arm 133 to the drum 65.

Figure 3:
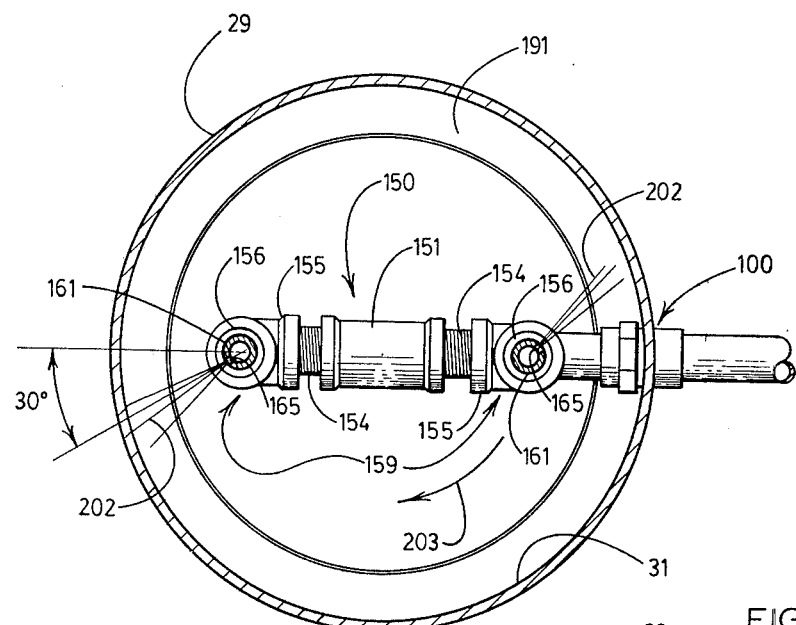
FIG. 3 is a horizontal section of a flue and elements of the apparatus of FIG. 1 taken on line 3—3 of FIG. 1.

The apparatus 10 has a bifurcated second or inlet bracket 150 shown in FIGS. 1 and 3, substantially identical to the outlet bracket 130, but disposed in inverted disposition relative thereto. The inlet bracket has a tee 151 having a central arm 152 tightly screw threadably engaged with the rotating nut 117 and disposed upwardly of the stationary elements of the swivel joint 60. This bracket has a pair of nipples 154 oppositely engaged with the tee and has a pair of elbows 155 individually engaged with the nipples. One arm of each elbow is upwardly directed and receives a bushing 156 which is aligned with one of the axes 143. The inlet bracket thus has a pair of opposite arms 159 through which washing fluid flows successively from the source thereof and through the central arm 152 to the bushings.

As shown, the apparatus 10 has a pair of substantially identical, cylindrically tubular spray conduits 160 extended parallel to the axis 62 between respective elbows 142 and 155. Each conduit has a lower inlet end 161 and an upper outlet end 162. The outlet ends of the conduits are individually concentrically fixed in fluid-tight relation within the bores 147 of the bushings 145 and the inlet ends are similarly fixed in the bushings 156, so that the conduits are individually aligned with the offset axes 143. The conduits thus extend interiorly of the flue between its lower end 26 and its upper end 27 and between the swivel joints 60 and 61 with the corresponding ends of the flue and the conduits adjacent to each other. The bifurcated brackets 130 and 150 fixedly connect the corresponding ends of the conduits and mount them on the corresponding swivel joints for rotation about the central axis 62. The conduits are thus mounted on the swivel joints so that washing fluid is supplied through the lower swivel joint 60 and the lower bracket 150 to the conduits and is supplied from the conduits through the upper bracket 130 and the upper swivel joint 61 to the bore 68 in the drum 65.

Each of the conduits 160 is provided with a plurality of orifices 165 substantially equally spaced therealong in a row parallel to the corresponding axis 143. The orifices are directed from this axis toward the interior surface 31 of the flue 25. The axis of each orifice is substantially right angularly related to the axis of its conduit and is disposed at an angle of approximately 30° in relation to a line passing through both of the axes of the conduits. That is, each orifice is angularly related to a radius passing through the central axis. The orifices are, of course, adapted to revolve about this axis together with their respective conduits and the brackets 130 and 150.

The apparatus 10 has a unitary rigid pipe 170 having an inlet end 171 fixedly mounted in screw threaded, fluid-tight relation in the bore 68 in the drum 65. This pipe has an outlet end 172 disposed within the fan 40. The pipe has a first portion 174 which extends horizontally and coaxially from the side bore to a point between the conduits 160 and the interior surface 31 of the flue 25. The pipe has a second portion 175 which extends vertically downwardly from this point parallel to the axis 62 to a point opposite the outlet opening 35 in the flue. The pipe has a third portion which extends horizontally from this point parallel to the first portion through the outlet opening, the duct 46, and the opening 45 to the outlet end. The pipe is thus formed so that it extends from the drum into the fan, but does not engage the upper bracket 130 or the conduits as they rotate about the central axis 62. The third portion is spaced upwardly of the axis of the fan rotor 50 in downwardly adjacent relation to the blades 52 when they are at their uppermost position.

The apparatus 10 has a spray nozzle 180 disposed centrally between the end 42 of the fan housing 41 and the disc 53. The nozzle is fixedly mounted on the outlet end 172 of the pipe 170. The nozzle is thus stationary and is connected in fluid-flow relation through the upper bracket and the pipe to the outlet ends 162 of the conduits 160 so as to receive washing fluid from the conduits. The nozzle has an orifice 182 which is directed upwardly toward the blades 52.

The apparatus 10 has a drain system shown in FIG. 1 and generally indicated by the numeral 185. This system has a vertical drain 187 extending downwardly from an opening 188 at the bottom of the fan housing 40 to a point below the lower end 26 of the flue 25. This pipe is connected to any suitable drain to waste, not shown, which receives material descending the pipe, as indicated by the arrow 189. The drain system has an annular band 191 disposed within the flue and mounted directly on its interior surface 31. The major axis of the band is inclined in relation to the central axis 62 with the lowest point of the periphery of the band disposed toward the drain pipe and adjacent to the opening 16. The band extends from its periphery upwardly and toward the central axis from the interior surface so as to define an annular trough 193 adjacent thereto. The flue has an opening 195 through its side wall 29 into the lowest portion of the trough. This opening is interconnected by a horizontal pipe 196 to the vertical pipe 187 for fluid flow from the trough into the vertical pipe.

OPERATION

The operation of the described embodiment of the present invention is believed to be clearly apparent and will be briefly described at this point.

As previously described, when the range 12 is in operation, the motor 55 is energized causing the fan 40 to draw air, as indicated by the arrows 57, over the cooking surface 13, through the flue 25, and through the fan for discharge through the duct 48. This air picks up matter from the cooking surface. This matter accumulates on the interior surface 31 of the flue and on the fan blades 52. From time to time, the apparatus 10 is supplied with washing fluid under pressure as indicated by the arrow 105. A quantity of this fluid flows to the lower bracket 150 as indicated by the arrows 119 and thence into the conduits 160 as indicated by the arrows 200. A portion of the fluid is emitted through the orifices 165 onto the interior surface in sprays indicated by the numeral 202.

Since the sprays 202 are angularly related to a radius through the axes 143 of the conduits 160, the reaction to the discharge of this portion of the washing fluid urges the conduits 160 and the brackets 130 and 150 to rotate in the direction indicated by the arrow 203 in FIG. 3. Since a plurality of the orifices are spaced along the conduits and the orifices are relatively close to the interior surface thereof, the sprays play vigorously upon every portion of this surface and wash the collected matter from it. This matter and the portion of the washing fluid emitted through the orifices flows gravitationally along the interior surface, as indicated by the arrows 205, into the trough 193. From the trough the matter and the portion of the fluid flow to the pipe 187 as indicated by the arrow 206.

The remaining portion of the quantity of washing fluid not emitted in the sprays 202 flows from the conduits 100 through the upper bracket 130 as indicated by the arrows 207, through the swivel joint 61 as indicated by the arrows 91, through the pipe 170, and into the nozzle 180. This remaining portion of the fluid is then emitted through the orifice 182 in a spray, indicated by the numeral 209, onto the fan blades 52 to wash accumulated matter from the blades. This matter and the corresponding portion of the washing fluid gravitate toward the bottom of the fan housing 41 from which they flow to waste through the pipe 187.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. In combination with an exhaust system provided with a substantially straight flue having opposite ends for conveying air containing matter which collects on the interior surface of the flue, a washing apparatus for the system comprising:

A. a first swivel joint adapted for the passage of fluid mounted on one end of the flue and connected to a source of washing fluid under pressure;
B. a second swivel joint mounted on the end of the flue opposite to said one end and defining with the first joint a common rotational axis extended centrally longitudinally of the flue;
C. a plurality of tubular conduits extending within the flue between the swivel joints parallel to said axis and spaced from the axis toward the interior surface of the flue, each conduit having a plurality of outwardly directed orifices spaced therealong and individually angularly related to radii of their respective conduits;
D. fluid conducting first bracket means rotatably mounted on the second swivel joint fixedly connecting the conduits adjacent thereto; and
E. fluid conducting second bracket means rotatably mounted on the first swivel joint fixedly connecting the conduits adjacent thereto and adapted to supply washing fluid from the first joint to the conduits for emission through the orifices reactively to urge the conduits together with the first bracket means and the second bracket means to rotate about the axis to wash the collected matter from the interior surface.

2. The combination of claim 1 wherein the exhaust system has a fan on which said matter collects disposed adjacent to the second swivel joint for drawing the air through the flue, the bracket means is adapted for the passage of washing fluid therethrough from the conduits, and the apparatus further comprises a stationary nozzle having an orifice directed toward the fan, and means interconnecting the bracket means and the nozzle to conduct said fluid to the nozzle to wash the matter from the fan.

* * * * *